United States Patent [19]
Russ, Sr.

[11] 3,756,668
[45] Sept. 4, 1973

[54] ENDLESS TRACK

[75] Inventor: Paul E. Russ, Sr., Englewood, Colo.

[73] Assignee: The Gates Rubber Company, Denver, Colo.

[22] Filed: June 16, 1971

[21] Appl. No.: 153,544

[52] U.S. Cl. .......................................... 305/35 EB
[51] Int. Cl. ............................................ B62d 55/24
[58] Field of Search ................... 305/35 EB, 38, 57, 305/24

[56] References Cited
UNITED STATES PATENTS

| | | | |
|---|---|---|---|
| 3,623,780 | 11/1971 | Kell | 305/38 |
| 3,205,023 | 9/1965 | Nodwell | 305/38 |
| 3,485,312 | 12/1969 | Swenson | 305/24 |
| 2,461,150 | 2/1949 | Flynn | 305/35 EB |
| 3,575,474 | 4/1971 | Russ | 305/35 EB |
| 3,680,925 | 8/1972 | Spivy | 305/38 |
| 3,694,040 | 9/1972 | Hallaman | 305/38 |
| 2,753,980 | 7/1956 | Ballard | 305/38 |

FOREIGN PATENTS OR APPLICATIONS 561,191  8/1958  Canada .......................... 305/35 EB Primary Examiner—Richard J. Johnson
Attorney—Raymond Fink et al.

[57] ABSTRACT

An endless track of the grouser-bar type having at least two flexible bands for mounting the grouser-bars in a spaced-apart relationship, the bands each having at least one row of spaced-apart and longitudinally aligned lugs projecting from the inside surface of each band.

7 Claims, 3 Drawing Figures

PATENTED SEP 4 1973
3,756,668
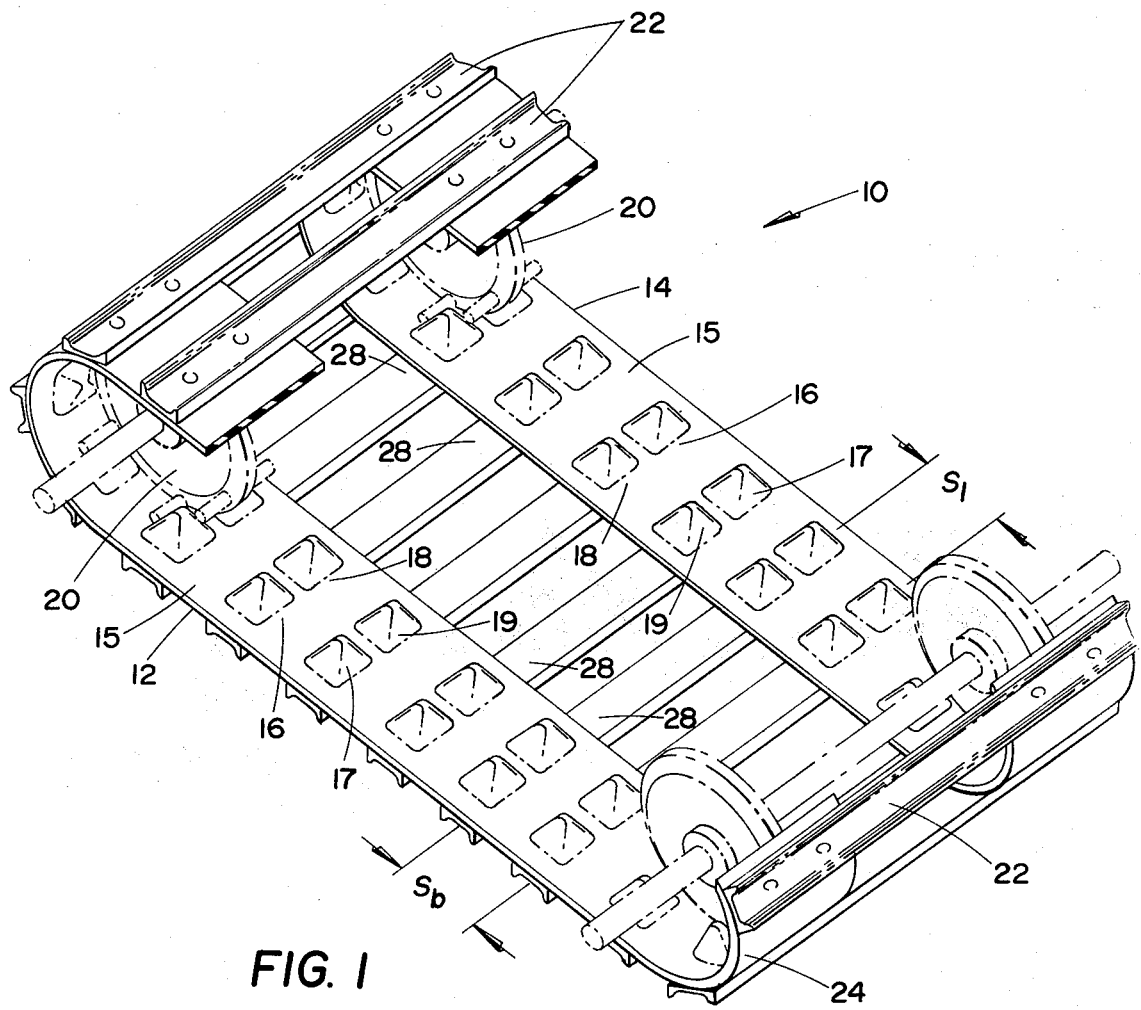
FIG. 1
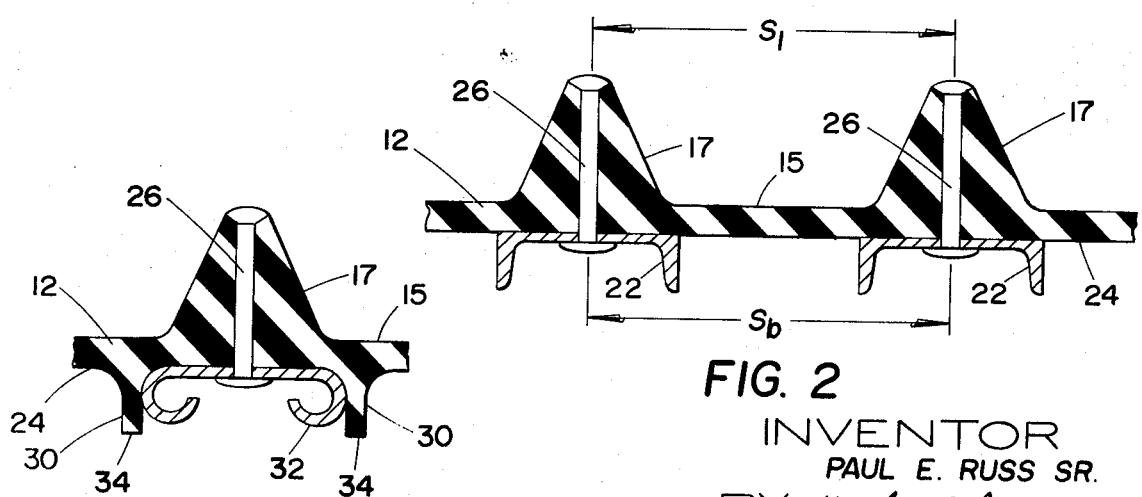
FIG. 3
FIG. 2
INVENTOR
PAUL E. RUSS SR.
BY H H Oberg Jr
ATTORNEY

3,756,668

ENDLESS TRACK

BACKGROUND OF THE INVENTION

The invention relates to wheel substitutes for land vehicles, but more particularly, the invention relates to flexible and endless track.

Grouser-bar tracks are widely used on snowmobiles. Such tracks are preferred over textile reinforced tracks where maximum transverse stiffness and longitudinal traction are desired, or where it is desired to have a plastic surfaced slide bar engage and support the inner surface of the track on the grouser-bars. The metal grouser-bars offer an excellent wear resistant surface. The tracks are of the fabricated or assembled type that include at least two flexible bands of substantially the same circumferential length. The bands are usually of a textile reinforced polymeric material. The bands are arranged in a spaced-apart and parallel fashion. A plurality of equally spaced grouser-bars are transversely aligned and attached to the outside surface of the bands by a plurality of fasteners such as pop rivets.

The tracks are powered or driven in a rotational manner by one or more sprocket wheels at the track inside surface. The teeth of the sprocket wheel have a pitch matching the spacing of the grouser-bars. The teeth mesh with successive grouser-bars to define a positive drive. The grouser-bars transmit the torque of the drive sprocket to the endless bands through the plurality of fasteners.

Accordingly, it is necessary for the grouser-bars to be properly in place and attached to the bands to effect an operative drive system. Should any of the grouser-bars become bent or dislodged, the sprocket drive system will be affected. A constant working of the fasteners through the grouser-bars sometimes causes the band material to shear and the grouser-bars to become dislodged which results in failure of the drive. As higher horsepower is transmitted through the sprocket wheel, more fasteners must be added to withstand the loads. An increase in the number of fasteners is uneconomical. Also, an increase in the number of fasteners may drastically weaken the flexible bands at the point of grouser-bar attachment.

Another disadvantage with pesent grouser-bar tracks is that the bars must be precisely spaced on the band to effect a smooth driving sprocket free of mechanical interference. Too much interference causes rapid wearing of the drive sprocket and introduces frictional horsepower losses.

SUMMARY OF THE INVENTION

In accordance with the invention, a grouser-bar track is provided having an improved positive drive. The track includes at least two bands of substantially the same length arranged side by side to have their longitudinal axes substantially parallel. A plurality of spaced-apart grouser-bars extend transversely across and are attached to the bands. At least one row of spaced-apart lugs are arranged longitudinally around the inside circumference of each band. The lugs receive and mesh with a drive wheel of known configuration to effect a positive drive system. The radially inward surface of the grouser-bars provide a surface for receiving a track supporting suspension system such as a slide bar.

Preferably, the pitch or spacing of the spaced-apart lugs corresponds to the pitch or spacing of the spaced-apart grouser-bars. A fastener extends through each lug and band to attach an end portion of a grouser-bar. The increased material of the lug provides an improved grouser-bar attachment that is less likely to fail in shear.

Accordingly, it is an object of the invention to provide a grouser-bar track having a positive drive system that is not subject to failure should grouser-bars become dislodged or deformed.

Another object of the invention is to provide a grouser-bar track that may easily be propelled by a drive wheel without interference and a resultant loss in drive system efficiency.

Another object of the invention is to provide a grouser-bar track having an improved fastener for attaching grouser-bars to flexible bands.

Still another object of the invention is to provide a grouser-bar track where it is not critical to have the grouser-bars perfectly aligned in a spaced-apart fashion.

Yet another object of the invention is to provide a grouser-bar track where the propelling torque of a sprocket wheel is not directly carried by fasteners that attach the grouser-bars.

These and other objects or advantages of the invention will become more apparent by reviewing the drawings and detailed description thereof wherein:

FIG. 1 is a partial isometric view of grouser-bar track including the features of the invention.

FIG. 2 is an enlarged view of a portion of FIG. 1 taken along the line 2—2 and showing a detailed feature of the invention.

FIG. 3 is a view similar to FIG. 2 but showing an alternate form of the invention.

DESCRIPTION OF PREFERRED EMBODIMENTS

Referring to FIG. 1, a grouser-bar track 10 is provided in accordance with the invention. The track is fabricated using at least two endless bands 12, 14 of substantially the same circumferential length. At least one row 16 of spaced-apart and longitudinally aligned lugs 17 project from the inner surface 15 of the bands. Preferably, two parallel rows 16, 18 of transversely aligned lugs 17, 19 are provided wherein the lugs of one row 16 are spaced-apart and aligned with the lugs of the other row 18. The lugs interface and mesh with a drive wheel 20 to effect a positive drive system. The flexible bands 12, 14 are of a reinforced polymeric material and are made by known processes.

The bands 12, 14 are arranged side by side to have their longitudinal axes sbustantially parallel. A plurality of spaced-apart grouser-bars 22 are transversely oriented in relation to and positioned between the bands 12, 14 on the outside surface 24 thereof. The spacing Sb of the bars 22 may be the same as or different from the spacing S1 of the lugs 17, 19. The bars may be attached to the track in any convenient manner. Preferably, the spacing Sb of the bars matches the spacing S1 or pitch of lugs to achieve two distinct advantages.

The stiffness or flexural rigidity of the bands is inherently greater in the area of the lugs. Where the bars and lugs have the same spacing, the bars may be directly located opposite the lugs. The stiffer area of the band at the lugs, provides improved support for the bars. Also, if the bars were to be positioned between the bands, the bars would increase the flexular rigidity of the track at their point of attachment. Too much flexural rigidity in the bands may impair the smooth operation and efficiency of the drive system.

The second advantage of positioning the grouser-bars 22 on the outside surface 24 of the bands and oppositely aligned with the drive lugs 17 is that a means for improving the grouser-bar attachment is provided. Referring now to FIG. 2, the grouser-bars 22 are attached to each band 12, 14 by means of a fastener 26. The fastener extends through a major portion or mass of a lug 17, through the band 12, and to the grouser-bar 22. The increased mass of the lug improves the shear strength of band at the point of attachment. Thus, greater shear forces may be transferred between the bars and bands before failure of the bands through shearing occurs.

When the track of the invention is in use, it is mounted in known fashion to a vehicle, such as snowmobile. A drive wheel or sprocket interfaces and meshes with lugs of the bands to effect a positive drive system. Because the drive wheel engages the lugs rather than the grouser-bars, the torque of the drive wheel is not concentrated to be transmitted through just a few grouser-bars. In accordance with the invention, torque of the drive wheel 20 is transmitted to the bands 12, 14 through the lugs 17, 19. Hence, the direct torque of the drive wheel to the grouser-bar is avoided. This reduces the structural loading at the point of grouser-bar attachment. Should one or more grouser-bars become dislodged or bent, the positive drive system is not affected as the track may still be propelled through the lugs.

The grouser-bars provide a plurality of wear resistant surfaces 28 that may be advantageously used in conjunction with a slide bar of the vehicle suspension system. Thus, the smooth running of a lug drive system is combined with the stiffnes and wear resistant qualities of grouser-bars to effect a new and improved track.

ADDITIONAL SPECIES

Referring to FIG. 3, another embodiment of the invention is shown. A plurality of spaced-apart tread or alignment bars 30 are provided which extend from the outside surface of the bands 12, 14. The tread bars 30 are oriented transversely in relation to the bands 12, 14. Each tread bar 30 may: extend across the width of each band 12, 14; extend across only a portion of each band 12, 14; or include a plurality of spaced-apart and generally aligned elements, not shown, that extend transversely across the bands 12, 14. Preferably, the spacing between the tread bars generally equals the width of a grouser-bar 32. The plurality of tread bars 30 extending around the outside circumference of the bands 12, 14 facilitate fabrication of the track 10 by providing a means for aligning the grouser-bars on the outside surface 24 of the bands 12, 14 prior to attachment with the fasteners 26.

Preferably, the tread bars 30 extend beyond the grouser-bars 32 to provide ground engaging polymeric surfaces 34. The surfaces 34 provide improved stability to the track. Also, where metal grouser-bars 32 are used, the polymeric surfaces 34 preclude the edges of the grouser bars from contacting and causing harmful damage to terrain such as asphalt road surfaces.

The foregoing detailed description was made for purpose of illustration only, and it is not intended to limit the scope of the invention which is to be determined from the appended claims.

What is claimed is:

1. In a wheel substitute land vehicle of the type having an endless grouser-bar track supported by a slide-bar suspension system, the improvement in the track drive system which comprises:

at least two endless bands of the reinforced polymeric type, said bands of substantially the same circumference and spaced side-by-side to have their longitudinal axes substantially parallel, and said bands having inner and outer surfaces;

at least two transversely spaced and aligned rows of lugs integrally molded with and protruding from the inner surface of each band, said lugs of a row longitudinally spaced and aligned on said bands;

longitudinally spaced grouser-bar means secured to the outer surface of said bands, holding said bands in spaced relationship and for transversely stiffening the track, the slide-bars of the suspension system engaging a portion of the grouser-bar means; and at least two drive wheels, each including means for meshing with said lugs of a band, each of said wheels arranged to engage the two rows of lugs of one of said bands, and said wheels adapted to propel the track.

2. A flexible track as set forth in claim 1 wherein the spacing of said grouser-bars corresponds to the spacing of said lugs.

3. A flexible track as set forth in claim 2 wherein each grouser-bar is oppositely aligned with a lug.

4. A flexible track as set forth in claim 3 wherein said means includes a fastener that extends through a band and portion of each lug.

5. A flexible track as set forth in claim 1 and further including means on the outer surface of each band for longitudinally spacing and transversely aligning said grouser-bars.

6. A flexible track as set forth in claim 5 wherein said alignment means includes a plurality of spaced-apart tread bars projecting transversely from the outer surface of each band.

7. A flexible track as set forth in claim 6 wherein said tread bars project from the outer surface of each band to a point beyond said grouser-bars, said tread bars defining a plurality of terrain-engaging surfaces.

* * * * *